US012738390B2

(12) United States Patent
Isaka et al.

(10) Patent No.: US 12,738,390 B2
(45) Date of Patent: Sep. 15, 2026

(54) COATED ELECTRICAL WIRE

(71) Applicant: DAIKIN INDUSTRIES, LTD., Osaka (JP)

(72) Inventors: Tadaharu Isaka, Osaka (JP); Yumi Zenke, Osaka (JP); Yukari Yamamoto, Osaka (JP); Yasuyuki Yamaguchi, Osaka (JP); Keizou Shiotsuki, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/453,683

(22) Filed: Aug. 22, 2023

(65) Prior Publication Data

US 2023/0395282 A1 Dec. 7, 2023

Related U.S. Application Data

(63) Continuation of application No. PCT/JP2022/003664, filed on Jan. 31, 2022.

(30) Foreign Application Priority Data

Feb. 26, 2021 (JP) ................................ 2021-031093
Sep. 30, 2021 (JP) ................................ 2021-162170

(51) Int. Cl.
*H01B 3/44* (2006.01)

(52) U.S. Cl.
CPC ............. *H01B 3/445* (2013.01); *H01B 3/441* (2013.01)

(58) Field of Classification Search
CPC .......... H01B 3/30; H01B 3/445; H01B 3/441; C08F 16/24; C08F 214/28; C08F 214/265; C08F 216/20; B32B 1/08; B32B 27/08
USPC ....... 174/110 R–120 SR; 526/247, 249, 250, 526/254, 255; 521/149; 428/36.91, 421, 428/422; 156/51, 60; 264/113, 127, 264/173.11, 173.13, 173.14
See application file for complete search history.

(56) References Cited

U.S. PATENT DOCUMENTS 3,635,926 A 1/1972 Gresham et al.
3,945,786 A 3/1976 Bishop
4,029,868 A 6/1977 Carlson
4,262,101 A 4/1981 Hartwimmer et al.
4,414,356 A 11/1983 Michel
4,510,300 A 4/1985 Levy
4,743,658 A 5/1988 Imbalzano et al.
4,902,444 A 2/1990 Kolouch
5,000,875 A 3/1991 Kolouch
5,656,392 A 8/1997 Sano et al.
5,703,185 A 12/1997 Blair
5,767,198 A 6/1998 Shimizu et al.
5,851,693 A 12/1998 Sano et al.
6,066,707 A 5/2000 Colaianna et al.
6,069,215 A 5/2000 Araki et al.
6,096,795 A 8/2000 Abusleme et al.
6,689,833 B1 2/2004 Bidstrup et al.
6,713,183 B2 3/2004 Araki et al.
6,740,375 B1 5/2004 Sagisaka et al.
6,774,196 B1 8/2004 Taira et al.
8,143,351 B2 3/2012 Shiotsuki et al.
11,826,975 B2 11/2023 Imamura et al.
2002/0011692 A1 1/2002 Lahijani
2002/0099143 A1 7/2002 Namura
2002/0167115 A1 11/2002 Tanaka
2003/0013791 A1 1/2003 Blong et al.
2003/0109646 A1* 6/2003 Kubo .................. C08G 65/007 525/420
2003/0114615 A1 6/2003 Sumi et al.
2003/0190530 A1 10/2003 Yang et al.
2003/0216531 A1 11/2003 Aten et al.
2004/0072935 A1 4/2004 Blong et al.
2004/0102572 A1* 5/2004 Kubo ......................... C08J 5/00 525/132
2004/0204536 A1 10/2004 Miyatani et al.
2004/0260044 A1 12/2004 Earnest, Jr. et al.
2005/0020792 A1 1/2005 Aoyama et al.
2005/0245626 A1 11/2005 Hoaglund et al.
2007/0112155 A1* 5/2007 Takase .................... C08F 14/24 526/250
2007/0149734 A1* 6/2007 Sakakibara ............. C08F 14/18 174/111

(Continued)

FOREIGN PATENT DOCUMENTS

CN 1527852 A 9/2004
CN 1599757 A 3/2005

(Continued)

OTHER PUBLICATIONS

Translation of the International Search Report issued Oct. 13, 2020 in International Application No. PCT/JP2020/032236.
Translation of the International Search Report issued Oct. 13, 2020 in International Application No. PCT/JP2020/032237.
Translation of the International Search Report issued Oct. 13, 2020 in International Application No. PCT/JP2020/032238.
Translation of the International Search Report issued Oct. 13, 2020 in International Application No. PCT/JP2020/032239.
Translation of the International Search Report issued Oct. 6, 2020 in International Application No. PCT/JP2020/032234.
International Preliminary Report on Patentability, with Translation of Written Opinion issued Mar. 1, 2022 in International Application No. PCT/JP2020/032238.

(Continued)

*Primary Examiner* — William H. Mayo, III
(74) *Attorney, Agent, or Firm* — Sughrue Mion, PLLC

(57) ABSTRACT

A coated electric wire having a core wire, and a coating layer installed on the periphery of the core wire, wherein the coating layer contains a copolymer containing tetrafluoroethylene unit and perfluoro(propyl vinyl ether) unit, the content of perfluoro(propyl vinyl ether) unit in the copolymer is 4.8 to 5.5% by mass with respect to the whole of the monomer units, the melt flow rate at 372° C. of the copolymer is 28.0 to 37.0 g/10 min, and the number of functional groups of the copolymer is 50 or less per $10^6$ main-chain carbon atoms.

18 Claims, No Drawings

(56) References Cited

U.S. PATENT DOCUMENTS

2007/0281166 A1* 12/2007 Nishio .................... B32B 7/027 264/173.13
2007/0292685 A1 12/2007 Brothers et al.
2008/0038627 A1 2/2008 Yamauchi et al.
2008/0114143 A1* 5/2008 Brothers ............. C08F 214/262 528/25
2008/0241534 A1 10/2008 Ohtani et al.
2009/0038821 A1* 2/2009 Sato .................... C08F 214/262 521/149
2009/0044965 A1* 2/2009 Kono ..................... H01B 3/445 174/110 SR
2009/0176952 A1 7/2009 Funaki et al.
2009/0246435 A1* 10/2009 Shimono ................... B32B 7/12 428/476.3
2010/0063214 A1 3/2010 Kasahara et al.
2010/0212929 A1* 8/2010 Ishii ....................... H01B 7/295 174/110 SR
2010/0273047 A1 10/2010 Kunoike et al.
2010/0314153 A1* 12/2010 Ishii ....................... H01B 3/445 428/141
2010/0314154 A1 12/2010 Kitahara et al.
2011/0052970 A1 3/2011 Kurata et al.
2011/0052977 A1 3/2011 Kurata et al.
2011/0203830 A1* 8/2011 Kono ..................... H01B 3/445 174/120 C
2011/0272173 A1* 11/2011 Shiotsuki ............... H01B 3/445 525/200
2012/0035329 A1 2/2012 Isogai et al.
2012/0064273 A1 3/2012 Bacino
2012/0094169 A1 4/2012 Kim et al.
2013/0046058 A1 2/2013 Pham et al.
2013/0130100 A1 5/2013 Kurata et al.
2014/0227533 A1* 8/2014 Murakami ............ B32B 27/304 156/60
2014/0287177 A1 9/2014 Suda et al.
2014/0378616 A1 12/2014 Nakano et al.
2015/0041145 A1 2/2015 Colaianna et al.
2015/0148481 A1 5/2015 Brothers et al.
2015/0158988 A1 6/2015 Sawaki et al.
2015/0353700 A1 12/2015 Isaka et al.
2016/0006004 A1 1/2016 Ogawa et al.
2016/0078979 A1 3/2016 Hosoda et al.
2016/0108159 A1 4/2016 Sekiguchi et al.
2016/0194491 A1 7/2016 Taguchi et al.
2016/0272805 A1* 9/2016 Nakanishi ................ C08K 3/22
2016/0319089 A1 11/2016 Imamura et al.
2016/0322128 A1 11/2016 Imamura et al.
2016/0340455 A1 11/2016 Abe et al.
2017/0008986 A1* 1/2017 Isaka ..................... C08F 214/26
2017/0025204 A1 1/2017 Chapman et al.
2017/0154707 A1 6/2017 Abe et al.
2017/0214037 A1 7/2017 Uematsu et al.
2017/0260344 A1 9/2017 Imamura et al.
2018/0009204 A1 1/2018 Higuchi et al.
2018/0237566 A1* 8/2018 Aida ................... C08F 214/265
2018/0265654 A1 9/2018 Imamura et al.
2018/0283590 A1 10/2018 Yokoyama et al.
2019/0134939 A1 5/2019 Colaianna et al.
2019/0143628 A1 5/2019 Colaianna et al.
2019/0177453 A1 6/2019 Isaka et al.
2019/0193315 A1 6/2019 Miyamoto et al.
2019/0375929 A1 12/2019 Nishimura et al.
2019/0382544 A1 12/2019 Yokotani et al.
2020/0332037 A1 10/2020 Isaka et al.
2021/0008827 A1 1/2021 Colaianna et al.
2021/0008828 A1 1/2021 Colaianna et al.
2021/0024709 A1 1/2021 Fukushima et al.
2021/0024769 A1 1/2021 Imamura et al.
2021/0189031 A1 6/2021 Hintzer et al.
2021/0246237 A1 8/2021 Isaka et al.
2021/0269568 A1 9/2021 Imamura et al.
2022/0001657 A1 1/2022 Kikuchi et al.
2022/0033636 A1 2/2022 Nishimura et al.
2022/0170573 A1 6/2022 Imamura et al.
2022/0181689 A1 6/2022 Isaka et al.
2022/0181698 A1 6/2022 Isaka et al.
2022/0181729 A1 6/2022 Isaka et al.
2022/0195088 A1 6/2022 Imamura et al.
2022/0213996 A1 7/2022 Imamura et al.
2022/0266485 A1 8/2022 Tsuda et al.
2022/0278403 A1 9/2022 Isaka et al.
2023/0227594 A1 7/2023 Yamamoto et al.
2023/0235107 A1 7/2023 Isaka et al.
2023/0235159 A1 7/2023 Isaka et al.
2023/0235160 A1 7/2023 Isaka et al.
2023/0238627 A1 7/2023 Isaka et al.
2023/0238628 A1 7/2023 Zenke et al.
2023/0238629 A1 7/2023 Isaka et al.
2023/0272136 A1 8/2023 Zenke et al.
2023/0295356 A1 9/2023 Isaka et al.
2023/0344077 A1 10/2023 Qiu et al.
2023/0383031 A1 11/2023 Isaka et al.
2023/0383032 A1 11/2023 Isaka et al.
2023/0383033 A1 11/2023 Zenke et al.
2023/0383034 A1 11/2023 Isaka et al.
2023/0390977 A1 12/2023 Hamada et al.
2023/0390978 A1 12/2023 Tsuda et al.
2023/0390979 A1 12/2023 Tsuda et al.
2023/0390980 A1 12/2023 Tsuda et al.
2023/0390981 A1 12/2023 Tsuda et al.
2023/0391909 A1 12/2023 Isaka et al.
2023/0391910 A1 12/2023 Isaka et al.
2023/0391911 A1 12/2023 Isaka et al.
2023/0391912 A1 12/2023 Isaka et al.
2023/0391917 A1 12/2023 Isaka et al.
2023/0391920 A1 12/2023 Isaka et al.
2023/0391927 A1 12/2023 Isaka
2023/0391929 A1 12/2023 Isaka et al.
2023/0391931 A1 12/2023 Isaka et al.
2023/0391932 A1 12/2023 Isaka et al.
2023/0391933 A1 12/2023 Isaka et al.
2023/0392737 A1 12/2023 Tsuda et al.
2023/0395282 A1 12/2023 Isaka et al.
2023/0399431 A1 12/2023 Isaka et al.
2023/0399432 A1 12/2023 Isaka et al.
2023/0399438 A1 12/2023 Isaka et al.
2023/0399441 A1 12/2023 Isaka et al.
2023/0399443 A1 12/2023 Isaka et al.
2023/0406975 A1 12/2023 Isaka et al.
2023/0406976 A1 12/2023 Isaka et al.
2023/0411751 A1 12/2023 Tsuda et al.
2023/0415387 A1 12/2023 Hamada et al.
2025/0002728 A1 1/2025 Zenke et al.
2025/0011488 A1 1/2025 Isaka et al.
2025/0011490 A1 1/2025 Isaka et al.
2025/0011494 A1 1/2025 Isaka et al.
2025/0011496 A1 1/2025 Yamamoto et al.
2025/0011498 A1 1/2025 Isaka et al.
2025/0011499 A1 1/2025 Isaka et al.
2025/0011500 A1 1/2025 Isaka et al.
2025/0019476 A1 1/2025 Isaka et al.
2025/0034302 A1 1/2025 Isaka et al.

FOREIGN PATENT DOCUMENTS

CN 101364456 A 2/2009
CN 103946250 A 7/2014
CN 107428144 A 12/2017
CN 109476061 3/2019
CN 110712348 A 1/2020
CN 110790854 A 2/2020
CN 114223086 A 3/2022
CN 114258609 A 3/2022
CN 116390957 A 7/2023
CN 116867821 A 10/2023
CN 116917346 A 10/2023
EP 0 220 910 A2 5/1987
EP 0 423 995 A1 4/1991
EP 0 976 544 A1 2/2000
EP 1 260 526 A1 11/2002
EP 1 462 458 A1 9/2004
EP 3 816 214 A1 5/2021
EP 4 024 550 A1 7/2022

(56) References Cited

FOREIGN PATENT DOCUMENTS

| | | | |
|---|---|---|---|
| EP | 4 024 575 | A1 | 7/2022 |
| EP | 4 223 793 | A1 | 8/2023 |
| EP | 4 223 794 | A1 | 8/2023 |
| GB | 1210794 | A | 10/1970 |
| JP | 48-20788 | B1 | 6/1973 |
| JP | 58-132512 | A | 8/1983 |
| JP | 58-191127 | A | 11/1983 |
| JP | 59-120433 | A | 7/1984 |
| JP | 62-104822 | A | 5/1987 |
| JP | 62-53019 | B2 | 11/1987 |
| JP | 1-53167 | B2 | 11/1989 |
| JP | 2-129253 | A | 5/1990 |
| JP | 3-184209 | A | 8/1991 |
| JP | 3-247609 | A | 11/1991 |
| JP | 4-357398 | A | 12/1992 |
| JP | 6-1902 | A | 1/1994 |
| JP | 6-40813 | B2 | 6/1994 |
| JP | 6-287405 | A | 10/1994 |
| JP | 7-16869 | A | 1/1995 |
| JP | 7-112449 | A | 5/1995 |
| JP | 7-188337 | A | 7/1995 |
| JP | 7-290496 | A | 11/1995 |
| JP | 8-207106 | A | 8/1996 |
| JP | 8-321287 | A | 12/1996 |
| JP | 9-245832 | A | 9/1997 |
| JP | 10-87746 | A | 4/1998 |
| JP | 10-158456 | A | 6/1998 |
| JP | 10-275604 | A | 10/1998 |
| JP | 10-292054 | A | 11/1998 |
| JP | 2001-151825 | A | 6/2001 |
| JP | 2001-151826 | A | 6/2001 |
| JP | 2001-283907 | A | 10/2001 |
| JP | 2001-283921 | A | 10/2001 |
| JP | 2002-53620 | A | 2/2002 |
| JP | 2002-63934 | A | 2/2002 |
| JP | 2002-167488 | A | 6/2002 |
| JP | 2003-327770 | A | 11/2003 |
| JP | 2003-534940 | A | 11/2003 |
| JP | 2004-256406 | A | 9/2004 |
| JP | 2004-534131 | A | 11/2004 |
| JP | 2005-523979 | A | 8/2005 |
| JP | 2005-298659 | A | 10/2005 |
| JP | 2005-320497 | A | 11/2005 |
| JP | 2006-117912 | A | 5/2006 |
| JP | 2006-312736 | A | 11/2006 |
| JP | 2007-238960 | A | 9/2007 |
| JP | 2008-66254 | A | 3/2008 |
| JP | 2009-42478 | A | 2/2009 |
| JP | 2009-59690 | A | 3/2009 |
| JP | 2009-235564 | A | 10/2009 |
| JP | 2009-272207 | A | 11/2009 |
| JP | 2010-56079 | A | 3/2010 |
| JP | 2010-509443 | A | 3/2010 |
| JP | 2010-87741 | A | 4/2010 |
| JP | 2010-162817 | A | 7/2010 |
| JP | 2010-235667 | A | 10/2010 |
| JP | 2011-48976 | A | 3/2011 |
| JP | 2011-71104 | A | 4/2011 |
| JP | 2012-54269 | A | 3/2012 |
| JP | 2012-80911 | A | 4/2012 |
| JP | 2012-106494 | A | 6/2012 |
| JP | 2012-130557 | A | 7/2012 |
| JP | 2013-71341 | A | 4/2013 |
| JP | 2013-82888 | A | 5/2013 |
| JP | 2013-177574 | A | 9/2013 |
| JP | 2014-28951 | A | 2/2014 |
| JP | 2014-59052 | A | 4/2014 |
| JP | 2014-187040 | A | 10/2014 |
| JP | 2015-7218 | A | 1/2015 |
| JP | 2015-519410 | A | 7/2015 |
| JP | 2015-147924 | A | 8/2015 |
| JP | 2015-168840 | A | 9/2015 |
| JP | 2016-537499 | A | 12/2016 |
| JP | 2017-197690 | A | 11/2017 |
| JP | 2018-20468 | A | 2/2018 |
| JP | 2018-514598 | A | 6/2018 |
| JP | 2018-523272 | A | 8/2018 |
| JP | 2018-159090 | A | 10/2018 |
| JP | 2019-172962 | A | 10/2019 |
| JP | 2019-210420 | A | 12/2019 |
| JP | 2019-214641 | A | 12/2019 |
| JP | 2020-2341 | A | 1/2020 |
| JP | 2020-15906 | A | 1/2020 |
| JP | 2020-29042 | A | 2/2020 |
| JP | 2020-100823 | A | 7/2020 |
| JP | 2020-100843 | A | 7/2020 |
| JP | 2021-6648 | A | 1/2021 |
| JP | 2021-141043 | A | 9/2021 |
| JP | 2021-141045 | A | 9/2021 |
| JP | 2022-19196 | A | 1/2022 |
| KR | 10-2004-0071160 | A | 8/2004 |
| KR | 10-2013-0069652 | A1 | 6/2013 |
| KR | 10-2019-0034205 | A | 4/2019 |
| WO | 95/29956 | A1 | 11/1995 |
| WO | 01/40331 | A1 | 6/2001 |
| WO | 03/006566 | A1 | 1/2003 |
| WO | 03/048214 | A1 | 6/2003 |
| WO | 2004/052987 | A1 | 6/2004 |
| WO | 2008/032613 | A1 | 3/2008 |
| WO | 2008/047759 | A1 | 4/2008 |
| WO | 2008/047906 | A1 | 4/2008 |
| WO | 2008/143069 | A1 | 11/2008 |
| WO | 2010/113864 | A1 | 10/2010 |
| WO | 2013/115374 | A1 | 8/2013 |
| WO | 2014/007346 | A1 | 1/2014 |
| WO | 2014/129413 | A1 | 8/2014 |
| WO | 2015/119053 | A1 | 8/2015 |
| WO | 2016/117492 | A1 | 7/2016 |
| WO | 2017/056203 | A1 | 4/2017 |
| WO | 2017/082417 | A1 | 5/2017 |
| WO | 2019/003265 | A1 | 1/2019 |
| WO | 2019/187725 | A1 | 10/2019 |
| WO | 2019/189316 | A1 | 10/2019 |
| WO | 2019/208492 | A1 | 10/2019 |
| WO | 2020/004083 | A1 | 1/2020 |
| WO | 2020/090981 | A1 | 5/2020 |
| WO | 2020/130144 | A1 | 6/2020 |
| WO | 2020/204163 | A1 | 10/2020 |
| WO | 2021/033539 | A1 | 2/2021 |
| WO | 2021/039862 | A1 | 3/2021 |
| WO | 2021/039863 | A1 | 3/2021 |
| WO | 2021/039865 | A1 | 3/2021 |
| WO | 2021039864 | A1 | 3/2021 |
| WO | 2021/059753 | A1 | 4/2021 |
| WO | 2022/181225 | A1 | 1/2022 |
| WO | 2022/181231 | A1 | 9/2022 |
| WO | 2022/181232 | A1 | 9/2022 |

OTHER PUBLICATIONS

International Preliminary Report on Patentability, with Translation of Written Opinion issued Mar. 1, 2022 in International Application No. PCT/JP2020/032239.

International Preliminary Report on Patentability, with Translation of Written Opinion issued Mar. 1, 2022 in International Application No. PCT/JP2020/032236.

International Preliminary Report on Patentability, with Translation of Written Opinion issued Mar. 1, 2022 in International Application No. PCT/JP2020/032237.

International Preliminary Report on Patentability, with Translation of Written Opinion issued Mar. 1, 2022 in International Application No. PCT/JP2020/032234.

Translation of the International Search Report dated Dec. 21, 2021 in International Application No. PCT/JP2021/036301.

Translation of the International Search Report dated Dec. 21, 2021 in International Application No. PCT/JP2021/036302.

Translation of the International Search Report dated Dec. 21, 2021 in International Application No. PCT/JP2021/036303.

Translation of the International Search Report dated Nov. 9, 2021 in International Application No. PCT/JP2021/036304.

Translation of the International Search Report dated Apr. 12, 2022 in International Application No. PCT/JP2022/003643.

(56) References Cited

OTHER PUBLICATIONS

Translation of the International Search Report dated Nov. 1, 2021 in International Application No. PCT/JP2021/036305.
Translation of the International Search Report dated Nov. 22, 2021 in International Application No. PCT/JP2021/036306.
Translation of the International Search Report dated Nov. 22, 2021 in International Application No. PCT/JP2021/036307.
Translation of the International Search Report dated Nov. 22, 2021 in International Application No. PCT/JP2021/036308.
Translation of the International Search Report dated Nov. 22, 2021 in International Application No. PCT/JP2021/036309.
Translation of the International Search Report dated Nov. 22, 2021 in International Application No. PCT/JP2021/036310.
Translation of the International Search Report dated Apr. 19, 2022 in International Application No. PCT/JP2022/003634.
Translation of the International Search Report dated Apr. 19, 2022 in International Application No. PCT/JP2022/003636.
Translation of the International Search Report dated Apr. 5, 2022 in International Application No. PCT/JP2022/003637.
Translation of the International Search Report dated Apr. 5, 2022 in International Application No. PCT/JP2022/003638.
Translation of the International Search Report dated Apr. 5, 2022 in International Application No. PCT/JP2022/003640.
Translation of the International Search Report dated Apr. 5, 2022 in International Application No. PCT/JP2022/003641.
Translation of the International Search Report dated Apr. 12, 2022 in International Application No. PCT/JP2022/003642.
Translation of the International Search Report dated Apr. 19, 2022 in International Application No. PCT/JP2022/003644.
Translation of the International Search Report dated Apr. 19, 2022 in International Application No. PCT/JP2022/003645.
Translation of the International Search Report dated Apr. 12, 2022 in International Application No. PCT/JP2022/003646.
Translation of the International Search Report dated Apr. 12, 2022 in International Application No. PCT/JP2022/003647.
Translation of the International Search Report dated Mar. 8, 2022 in International Application No. PCT/JP2022/003648.
Translation of the International Search Report dated Apr. 19, 2022 in International Application No. PCT/JP2022/003649.
Translation of the International Search Report dated Apr. 19, 2022 in International Application No. PCT/JP2022/003650.
Translation of the International Search Report dated Apr. 19, 2022 in International Application No. PCT/JP2022/003651.
Translation of the International Search Report dated Mar. 22, 2022 in International Application No. PCT/JP2022/003652.
Translation of the International Search Report dated Apr. 19, 2022 in International Application No. PCT/JP2022/003653.
Translation of the International Search Report dated Apr. 19, 2022 in International Application No. PCT/JP2022/003654.
Translation of the International Search Report dated Mar. 22, 2022 in International Application No. PCT/JP2022/003657.
Translation of the International Search Report dated Mar. 22, 2022 in International Application No. PCT/JP2022/003658.
Translation of the International Search Report dated Apr. 19, 2022 in International Application No. PCT/JP2022/003659.
Translation of the International Search Report dated Mar. 8, 2022 in International Application No. PCT/JP2022/003660.
Translation of the International Search Report dated Mar. 15, 2022 in International Application No. PCT/JP2022/003661.
Translation of the International Search Report dated Apr. 19, 2022 in International Application No. PCT/JP2022/003664.
Translation of the International Search Report dated Apr. 19, 2022 in International Application No. PCT/JP2022/003665.
Translation of the International Search Report dated May 24, 2022 in International Application No. PCT/JP2022/007735.
Translation of the International Search Report dated May 17, 2022 in International Application No. PCT/JP2022/007737.
Translation of the International Search Report dated May 10, 2022 in International Application No. PCT/JP2022/007738.
Translation of the International Search Report dated Apr. 19, 2022 in International Application No. PCT/JP2022/003635.
International Preliminary Report on Patentability, with Translation of Written Opinion issued Mar. 28, 2023 in International Application No. PCT/JP2021/036301.
International Preliminary Report on Patentability, with Translation of Written Opinion issued Mar. 28, 2023 in International Application No. PCT/JP2021/036302.
International Preliminary Report on Patentability, with Translation of Written Opinion issued Mar. 28, 2023 in International Application No. PCT/JP2021/036303.
International Preliminary Report on Patentability, with Translation of Written Opinion issued Mar. 28, 2023 in International Application No. PCT/JP2021/036304.
International Preliminary Report on Patentability, with Translation of Written Opinion issued Mar. 28, 2023 in International Application No. PCT/JP2021/036305.
International Preliminary Report on Patentability, with Translation of Written Opinion issued Mar. 28, 2023 in International Application No. PCT/JP2021/036306.
International Preliminary Report on Patentability, with Translation of Written Opinion issued Mar. 28, 2023 in International Application No. PCT/JP2021/036307.
International Preliminary Report on Patentability, with Translation of Written Opinion issued Mar. 28, 2023 in International Application No. PCT/JP2021/036308.
International Preliminary Report on Patentability, with Translation of Written Opinion issued Mar. 28, 2023 in International Application No. PCT/JP2021/036309.
International Preliminary Report on Patentability, with Translation of Written Opinion issued Mar. 28, 2023 in International Application No. PCT/JP2021/036310.
European Search Report issued Aug. 2, 2023 for European Patent Application No. 20 857 704.9.
International Preliminary Report on Patentability, with Translation of Written Opinion issued Aug. 29, 2023 in International Application No. PCT/JP2022/003634.
International Preliminary Report on Patentability, with Translation of Written Opinion issued Aug. 29, 2023 in International Application No. PCT/JP2022/003635.
International Preliminary Report on Patentability, with Translation of Written Opinion issued Aug. 29, 2023 in International Application No. PCT/JP2022/003636.
International Preliminary Report on Patentability, with Translation of Written Opinion issued Aug. 29, 2023 in International Application No. PCT/JP2022/003637.
International Preliminary Report on Patentability, with Translation of Written Opinion issued Aug. 29, 2023 in International Application No. PCT/JP2022/003638.
International Preliminary Report on Patentability, with Translation of Written Opinion issued Aug. 29, 2023 in International Application No. PCT/JP2022/003640.
International Preliminary Report on Patentability, with Translation of Written Opinion issued Aug. 29, 2023 in International Application No. PCT/JP2022/003641.
International Preliminary Report on Patentability, with Translation of Written Opinion issued Aug. 29, 2023 in International Application No. PCT/JP2022/003642.
International Preliminary Report on Patentability, with Translation of Written Opinion issued Aug. 29, 2023 in International Application No. PCT/JP2022/003643.
International Preliminary Report on Patentability, with Translation of Written Opinion issued Aug. 29, 2023 in International Application No. PCT/JP2022/003644.
International Preliminary Report on Patentability, with Translation of Written Opinion issued Aug. 29, 2023 in International Application No. PCT/JP2022/003645.
International Preliminary Report on Patentability, with Translation of Written Opinion issued Aug. 29, 2023 in International Application No. PCT/JP2022/003646.
International Preliminary Report on Patentability, with Translation of Written Opinion issued Aug. 29, 2023 in International Application No. PCT/JP2022/003647.

(56) References Cited

OTHER PUBLICATIONS

International Preliminary Report on Patentability, with Translation of Written Opinion issued Aug. 29, 2023 in International Application No. PCT/JP2022/003648.
International Preliminary Report on Patentability, with Translation of Written Opinion issued Aug. 29, 2023 in International Application No. PCT/JP2022/003649.
International Preliminary Report on Patentability, with Translation of Written Opinion issued Aug. 29, 2023 in International Application No. PCT/JP2022/003650.
International Preliminary Report on Patentability, with Translation of Written Opinion issued Aug. 29, 2023 in International Application No. PCT/JP2022/003651.
International Preliminary Report on Patentability, with Translation of Written Opinion issued Aug. 29, 2023 in International Application No. PCT/JP2022/003652.
International Preliminary Report on Patentability, with Translation of Written Opinion issued Aug. 29, 2023 in International Application No. PCT/JP2022/003653.
International Preliminary Report on Patentability, with Translation of Written Opinion issued Aug. 29, 2023 in International Application No. PCT/JP2022/003654.
International Preliminary Report on Patentability, with Translation of Written Opinion issued Aug. 29, 2023 in International Application No. PCT/JP2022/003657.
International Preliminary Report on Patentability, with Translation of Written Opinion issued Aug. 29, 2023 in International Application No. PCT/JP2022/003658.
International Preliminary Report on Patentability, with Translation of Written Opinion issued Aug. 29, 2023 in International Application No. PCT/JP2022/003659.
International Preliminary Report on Patentability, with Translation of Written Opinion issued Aug. 29, 2023 in International Application No. PCT/JP2022/003660.
International Preliminary Report on Patentability, with Translation of Written Opinion issued Aug. 29, 2023 in International Application No. PCT/JP2022/003661.
International Preliminary Report on Patentability, with Translation of Written Opinion issued Aug. 29, 2023 in International Application No. PCT/JP2022/003664.
International Preliminary Report on Patentability, with Translation of Written Opinion issued Aug. 29, 2023 in International Application No. PCT/JP2022/003665.
International Preliminary Report on Patentability, with Translation of Written Opinion issued Aug. 29, 2023 in International Application No. PCT/JP2022/007735.
International Preliminary Report on Patentability, with Translation of Written Opinion issued Aug. 29, 2023 in International Application No. PCT/JP2022/007737.
International Preliminary Report on Patentability, with Translation of Written Opinion issued Aug. 29, 2023 in International Application No. PCT/JP2022/007738.
Translation of the International Search Report dated Jun. 20, 2023 in International Application No. PCT/JP2023/013284.
Translation of the International Search Report dated Jun. 6, 2023 in International Application No. PCT/JP2023/013285.
Translation of the International Search Report dated Jun. 6, 2023 in International Application No. PCT/JP2023/013289.
Translation of the International Search Report dated Jun. 6, 2023 in International Application No. PCT/JP2023/013291.
Translation of the International Search Report dated Jun. 6, 2023 in International Application No. PCT/JP2023/013292.
Translation of the International Search Report dated Jun. 6, 2023 in International Application No. PCT/JP2023/013293.
Translation of the International Search Report dated Jun. 6, 2023 in International Application No. PCT/JP2023/013331.
Translation of the International Search Report dated Jun. 6, 2023 in International Application No. PCT/JP2023/013332.
Translation of the International Search Report dated Jun. 6, 2023 in International Application No. PCT/JP2023/013333.
Translation of the International Search Report dated Jun. 20, 2023 in International Application No. PCT/JP2023/013290.
European Search Report issued Oct. 20, 2023 for European Patent Application No. 20 856 953.3.
European Search Report issued Oct. 20, 2023 for European Patent Application No. 20 857 574.6.
European Search Report issued Oct. 20, 2023 for European Patent Application No. 20 857 843.5.
European Search Report issued Oct. 20, 2023 for European Patent Application No. 20 857 470.7.
European Search Report issued Dec. 4, 2024 for European Patent Application No. 22759287.0.
European Search Report issued Dec. 5, 2024 for European Patent Application No. 22759265.6.
European Search Report issued Dec. 10, 2024 for European Patent Application No. 22759267.2.
European Search Report issued Dec. 13, 2024 for European Patent Application No. 22 759 272.2.
European Search Report issued Dec. 16, 2024 for European Patent Application No. 22759276.3.
European Search Report issued Dec. 13, 2024 for European Patent Application No. 22759273.0.
European Search Report issued Dec. 19, 2024 for European Patent Application No. 22759264.9.
European Search Report issued Dec. 19, 2024 for European Patent Application No. 22759277.1.
European Search Report issued Jan. 2, 2025 for European Patent Application No. 22759281.3.
European Search Report issued Jan. 3, 2025 for European Patent Application No. 22759261.5.
European Search Report issued Jan. 3, 2025 for European Patent Application No. 22759274.8.
European Search Report issued Jan. 16, 2025 for European Patent Application No. 22759269.8.
European Search Report issued Jan. 14, 2025 for European Patent Application No. 22759282.1.
European Search Report issued Jan. 14, 2025 for European Patent Application No. 22759262.3.
European Search Report issued Jan. 16, 2025 for European Patent Application No. 22759284.7.
European Search Report issued Jan. 27, 2025 for European Patent Application No. 22759268.0.
European Search Report issued Jan. 27, 2025 for European Patent Application No. 22759285.4.
European Search Report issued Feb. 4, 2025 for European Patent Application No. 22759266.4.
Paolo Corbelli, "ASTM D638: tensile test for plastics", Jul. 30, 2024, XP093227725, Retrieved from the Internet: URL:https://www.cermacsrl.com/en/astm-d638-tensile-test-for-plastics/, pp. 1-9 (9 total pages).
Keun Park et al., "Eliminating weldlines of an injection-molded part with the aid of high-frequency induction heating", Journal of Mechanical Science and Technology, vol. 24, No. 1, XP055158055, 2010, pp. 149-152 (4 total pages).
Nanyang Zhao et al., "In situ flow state characterization of molten resin at the inner mold in injection molding", Journal of Applied Polymer Science, John Wiley & Sons, Inc, US, vol. 141, No. 9, XP072571824, 2023, pp. 1-16 (16 total pages).
European Search Report issued Feb. 10, 2025 for European Patent Application No. 22759283.9.
European Search Report issued Feb. 20, 2025 for European Patent Application No. 22759263.1.
International Search Report dated Jun. 20, 2023 in International Application No. PCT/JP2023/013284.
International Search Report dated Jun. 6, 2023 in International Application No. PCT/JP2023/013285.
International Search Report dated Jun. 6, 2023 for International Application No. PCT/JP2023/013289.
International Search Report dated Jun. 20, 2023 for International Application No. PCT/JP2023/013290.
International Search Report dated Jun. 6, 2023 for International Application No. PCT/JP2023/013291.

(56) References Cited

OTHER PUBLICATIONS

International Search Report dated Jun. 6, 2023 for International Application No. PCT/JP2023/013292.
International Search Report dated Jun. 6, 2023 for International Application No. PCT/JP2023/013293.
International Search Report dated Jun. 6, 2023 for International Application No. PCT/JP2023/013331.
International Search Report dated Jun. 6, 2023 for International Application No. PCT/JP2023/013332.
International Search Report dated Jun. 6, 2023 for International Application No. PCT/JP2023/013333.
International Preliminary Report on Patentability, with Translation of Written Opinion issued Sep. 24, 2024 in International Application No. PCT/JP2023/013284.
International Preliminary Report on Patentability, with Translation of Written Opinion issued Sep. 24, 2024 in International Application No. PCT/JP2023/013285.
International Preliminary Report on Patentability, with Translation of Written Opinion issued Sep. 24, 2024 in International Application No. PCT/JP2023/013289.
International Preliminary Report on Patentability, with Translation of Written Opinion issued Sep. 24, 2024 in International Application No. PCT/JP2023/013290.
International Preliminary Report on Patentability, with Translation of Written Opinion issued Sep. 24, 2024 in International Application No. PCT/JP2023/013291.
International Preliminary Report on Patentability, with Translation of Written Opinion issued Sep. 24, 2024 in International Application No. PCT/JP2023/013292.
International Preliminary Report on Patentability, with Translation of Written Opinion issued Sep. 24, 2024 in International Application No. PCT/JP2023/013293.
International Preliminary Report on Patentability, with Translation of Written Opinion issued Sep. 24, 2024 in International Application No. PCT/JP2023/013331.
International Preliminary Report on Patentability, with Translation of Written Opinion issued Sep. 24, 2024 in International Application No. PCT/JP2023/013332.
International Preliminary Report on Patentability, with Translation of Written Opinion issued Sep. 24, 2024 in International Application No. PCT/JP2023/013333.
European Search Report issued Aug. 27, 2024 for European Patent Application No. 21875831.6.
European Search Report issued Aug. 27, 2024 for European Patent Application No. 21875832.4.
European Search Report issued Aug. 29, 2024 for European Patent Application No. 21875833.2.
European Search Report issued Aug. 29, 2024 for European Patent Application No. 21875834.0.
European Search Report issued Sep. 9, 2024 for European Patent Application No. 21875826.6.
European Search Report issued Sep. 9, 2024 for European Patent Application No. 21875828.2.
European Search Report issued Sep. 9, 2024 for European Patent Application No. 21875829.0.
European Search Report issued Sep. 9, 2024 for European Patent Application No. 21875830.8.
European Search Report issued Sep. 10, 2024 for European Patent Application No. 21875835.7.
European Search Report issued Sep. 19, 2024 for European Patent Application No. 21875827.4.
Extended European Search Report dated Mar. 11, 2026 in application No. 23 780 928.0.
Extended European Search Report dated Mar. 11, 2026 in application No. 23 780 929.8.
Extended European Search Report dated Mar. 11, 2026 in application No. 23 780 936.3.
Extended European Search Report dated Mar. 11, 2026 in application No. 23 780 953.8.
Extended European Search Report dated Mar. 11, 2026 in application No. 23 780 954.6.
Extended European Search Report dated Mar. 11, 2026 in application No. 23 780 955.3.
Extended European Search Report dated Mar. 11, 2026 in application No. 23 780 932.2.
Extended European Search Report dated Mar. 11, 2026 in application No. 23 780 933.0.
Extended European Search Report dated Mar. 11, 2026 in application No. 23 780 934.8.

* cited by examiner

COATED ELECTRICAL WIRE

CROSS-REFERENCE TO RELATED APPLICATIONS

This application is a Rule 53(b) Continuation of International Application No. PCT/JP2022/003664 filed Jan. 31, 2022, which claims priorities based on Japanese Patent Application No. 2021-031093 filed Feb. 26, 2021 and Japanese Patent Application No. 2021-162170 filed Sep. 30, 2021, the respective disclosures of which are incorporated herein by reference in their entirety.

TECHNICAL FIELD

The present disclosure relates to a coated electric wire.

BACKGROUND ART

Patent Document 1 describes a coated electric wire obtained by coating a TFE-based copolymer on a core wire, the copolymer having TFE unit originated from tetrafluoroethylene [TFE] and a PAVE unit originated from perfluoro (alkyl vinyl ether) [PAVE], having the PAVE unit higher than 5% by mass and 20% by mass or lower of the whole of the monomer units, having unstable terminal groups of 10 or less per $1\times10^6$ carbon atoms, and having a melting point of 260° C. or higher.

RELATED ART

Patent Document

Patent Document 1: Japanese Patent Laid-Open No. 2009-059690

SUMMARY

According to the present disclosure, there is provided a coated electric wire having a core wire and a coating layer installed on the periphery of the core wire, wherein the coating layer contains a copolymer containing tetrafluoroethylene unit and perfluoro(propyl vinyl ether) unit, the content of perfluoro(propyl vinyl ether) unit in the copolymer is 4.8 to 5.5% by mass with respect to the whole of the monomer units, the melt flow rate at 372° C. of the copolymer is 28.0 to 37.0 g/10 min, and the number of functional groups of the copolymer is 50 or less per $10^6$ main-chain carbon atoms.

EFFECTS

According to the present disclosure, there can be provided a coated electric wire which has less defects, hardly corrodes a core wire even in a wet carbon dioxide environment, and has a coating layer excellent in the long-time tensile creep property, the crack resistance at high temperatures and the abrasion resistance.

DESCRIPTION OF EMBODIMENTS

Hereinafter, specific embodiments of the present disclosure will now be described in detail, but the present disclosure is not limited to the following embodiments.

The coated electric wire of the present disclosure has a core wire, and a coating layer installed on the periphery of the core wire, wherein the coating layer contains a copolymer containing tetrafluoroethylene unit and perfluoro(propyl vinyl ether) unit.

As the steel material used in facilities such as hot spring pumping facilities, underground heat utilizing facilities, pumping facilities for crude oil or natural gas, and the like, a steel material having an excellent corrosion resistance even in a wet carbon dioxide environment also called as sweet environment is often used. However, a steel material usually used for communication cable is used in the core wire of the communication cable used in these facilities, and there is a problem in that the use in a wet carbon dioxide environment for a long term may result in degradation of the communication performance.

In the coated electric wire described in Patent Document 1, since the core wire is coated by the TFE-based copolymer and the TFE-based copolymer has more excellent chemical resistance and heat resistance than other typical covering materials, the core wire can be protected from corrosion over a relatively long term. However, there is required a coated electric wire which can protect the core wire even in a wet carbon dioxide environment further for a long term and has less defects, and in which the coating layer hardly deforms even in long use under a high temperature environment, hardly generates cracks even at high temperatures, and is hardly abraded.

The coated electric wire of the present disclosure has a coating layer containing the copolymer in which the content of PPVE unit, the melt flow rate (MFR) and the number of functional groups of the copolymer containing TFE unit and PPVE unit are suitably regulated. The coating layer has less defects and is excellent in the long-time tensile creep property, the crack resistance at high temperatures and the abrasion resistance. Furthermore, in the coated electric wire of the present disclosure, since the core wire is hardly corroded even being utilized in a wet carbon dioxide environment, the communication performance is hardly degraded and a high reliability can be maintained for a long term.

The copolymer contained in the coating layer of the present disclosure is a melt-fabricable fluororesin. Being melt-fabricable means that a polymer can be melted and processed by using a conventional processing device such as an extruder or an injection molding machine.

The content of the PPVE unit of the copolymer is, with respect to the whole of the monomer units, 4.8 to 5.5% by mass, preferably 4.9% by mass or higher, and more preferably 5.0% by mass or higher, and preferably 5.4% mass or lower. When the content of the PPVE unit of the copolymer is too small, the crack resistance and the abrasion resistance of the coating layer tend to deteriorate. When the content of the PPVE unit of the copolymer is too large, the long-time tensile creep property of the coating layer tends to deteriorate.

The content of the TFE unit of the copolymer is, with respect to the whole of the monomer units, preferably 94.5 to 95.2% by mass, and more preferably 94.6% by mass or higher, and more preferably 95.1% by mass or lower, and still more preferably 95.0% by mass or lower. When the content of the TFE unit of the copolymer is too large, the crack resistance and the abrasion resistance of the coating layer tend to deteriorate. When the content of the TFE unit of the copolymer is too small, the long-time tensile creep property of the coating layer tends to deteriorate.

In the present disclosure, the content of each monomer unit in the copolymer is measured by a $^{19}$F-NMR method.

The copolymer can also contain a monomer unit originated from a monomer copolymerizable with TFE and PPVE. In this case, the content of the monomer unit copolymerizable with TFE and PPVE is, with respect to the whole of the monomer units of the copolymer, preferably 0 to 1.5% by mass, more preferably 0.1 to 0.7% by mass, and still more preferably 0.2 to 0.3% by mass.

The monomers copolymerizable with TFE and PPVE may include hexafluoropropylene (HFP), vinyl monomers represented by $CZ^1Z^2{=}CZ^3(CF_2)_nZ^4$ wherein $Z^1$, $Z^2$ and $Z^3$ are identical or different, and represent H or F; $Z^4$ represents H, F or Cl; and n represents an integer of 2 to 10, perfluoro (alkyl vinyl ether) [PAVE] (provided that, PPVE is excluded) represented by $CF_2{=}CF{-}ORf^1$ wherein $Rf^1$ is a perfluoroalkyl group having 1 to 8 carbon atoms, and alkyl perfluorovinyl ether derivatives represented by $CF_2{=}CF{-}OCH_2{-}Rf^1$ wherein $Rf^1$ represents a perfluoroalkyl group having 1 to 5 carbon atoms. Among these, HFP is preferred.

The copolymer is preferably at least one selected from the group consisting of a copolymer consisting only of the TFE unit and the PPVE unit, and TFE/HFP/PPVE copolymer, and is more preferably a copolymer consisting only of the TFE unit and the PPVE unit.

The melt flow rate (MFR) of the copolymer is 28.0 to 37.0 g/10 min. The MFR of the copolymer is preferably 29.0 g/10 min or higher, and more preferably 30.0 g/10 min or higher, and preferably 36.0 g/10 min or lower, and more preferably 35.0 g/10 min. When the MFR of the copolymer is too low, defects of the coating layer tend to increase, and the long-time tensile creep property and the crack resistance of the coating layer tend to deteriorate.

For identification of the kind of the functional groups and measurement of the number of the functional groups, infrared spectroscopy can be used.

The number of the functional groups is measured, specifically, by the following method. First, the copolymer is molded by cold press to prepare a film of 0.25 to 0.30 mm in thickness. The film is analyzed by Fourier transform infrared spectroscopy to obtain an infrared absorption spectrum of the copolymer, and a difference spectrum against a base spectrum that is completely fluorinated and has no functional groups is obtained. From an absorption peak of a specific functional group observed on this difference spectrum, the number N of the functional group per $1\times10^6$ carbon atoms in the copolymer is calculated according to the following formula (A).

$$N=I\times K/t \tag{A}$$

I: absorbance

K: correction factor t: thickness of film (mm)

For reference, for some functional groups, the absorption frequency, the molar absorption coefficient and the correction factor are shown in Table 1. Then, the molar absorption coefficients are those determined from FT-IR measurement data of low molecular model compounds.

[Table 1]

TABLE 1

| Functional Group | Absorption Frequency ($cm^{-1}$) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| $—COOCH_3$ | 1795 | 680 | 342 | $C_7F_{15}COOCH_3$ |
| $—CONH_2$ | 3436 | 506 | 460 | $C_7H_{15}CONH_2$ |
| $—CH_2OH_2$, —OH | 3648 | 104 | 2236 | $C_7H_{15}CH_2OH$ |
| $—CF_2H$ | 3020 | 8.8 | 26485 | $H(CF_2CF_2)_3CH_2OH$ |
| $—CF{=}CF_2$ | 1795 | 635 | 366 | $CF_2{=}CF_2$ |

time tensile creep property of the coating layer tends to deteriorate. When the MFR of the copolymer is too high, the abrasion resistance and the crack resistance of the coating layer tend to deteriorate.

In the present disclosure, the MFR is a value obtained as a mass (g/10 min) of the polymer flowing out from a nozzle of 2.1 mm in inner diameter and 8 mm in length per 10 min at 372° C. under a load of 5 kg using a melt indexer, according to ASTM D1238.

The MFR can be regulated by regulating the kind and amount of a polymerization initiator to be used in polymerization of monomers, the kind and amount of a chain transfer agent, and the like.

The number of functional groups per $10^6$ main-chain carbon atoms of the copolymer is 50 or less. The number of functional groups per $10^6$ main-chain carbon atoms of the copolymer is preferably 40 or less, more preferably 30 or less, still more preferably 20 or less, further still more preferably 15 or less, especially preferably 10 or less and most preferably 6 or less. When the number of the functional groups of the copolymer is too large, the core wire tends to be corroded in a wet carbon dioxide environment, and the Absorption frequencies of $—CH_2CF_2H$, $—CH_2COF$, $—CH_2COOH$, $—CH_2COOCH_3$ and $—CH_2CONH_2$ are lower by a few tens of kaysers ($cm^{-1}$) than those of $—CF_2H$, —COF, —COOH free and —COOH bonded, $—COOCH_3$ and $—CONH_2$ shown in the Table, respectively.

For example, the number of the functional group —COF is the total of the number of a functional group determined from an absorption peak having an absorption frequency of 1,883 $cm^{-1}$ derived from $—CF_2COF$ and the number of a functional group determined from an absorption peak having an absorption frequency of 1,840 $cm^{-1}$ derived from $—CH_2COF$.

The functional groups are ones present on main chain terminals or side chain terminals of the copolymer, and ones present in the main chain or the side chains. The number of the functional groups may be the total of numbers of $—CF{=}CF_2$, $—CF_2H$, —COF, —COOH, $—COOCH_3$, $—CONH_2$ and $—CH_2OH$.

The functional groups are introduced to the copolymer by, for example, a chain transfer agent or a polymerization initiator used for production of the copolymer. For example, in the case of using an alcohol as the chain transfer agent, or a peroxide having a structure of —$CH_2OH$ as the polymerization initiator, —$CH_2OH$ is introduced on the main chain terminals of the copolymer. Alternatively, the functional group is introduced on the side chain terminal of the copolymer by polymerizing a monomer having the functional group.

The copolymer satisfying the above range regarding the number of functional groups can be obtained by subjecting the copolymer to a fluorination treatment. That is, the copolymer forming the coating layer is preferably one which is subjected to the fluorination treatment. Further, the copolymer forming the coating layer preferably has —$CF_3$ terminal groups.

The melting point of the copolymer is preferably 285 to 310° C., more preferably 290° C. or higher, still more preferably 294° C. or higher, and especially preferably 300° C. or higher, and more preferably 303° C. or lower. Due to that the melting point is in the above range, there can be obtained the copolymer giving formed articles better in the mechanical strength particularly at high temperatures.

In the present disclosure, the melting point can be measured by using a differential scanning calorimeter [DSC].

The copolymer used in the coating layer of the present disclosure can be produced by a polymerization method such as suspension polymerization, solution polymerization, emulsion polymerization or bulk polymerization. The polymerization method is preferably emulsion polymerization or suspension polymerization. In these polymerization methods, conditions such as temperature and pressure, and a polymerization initiator and other additives can suitably be set depending on the formulation and the amount of the copolymer.

As the polymerization initiator, an oil-soluble radical polymerization initiator, or a water-soluble radical polymerization initiator may be used.

The oil-soluble radical polymerization initiator may be a known oil-soluble peroxide, and examples thereof typically include:

- dialkyl peroxycarbonates such as di-n-propyl peroxydicarbonate, diisopropyl peroxydicarbonate, di-sec-butyl peroxydicarbonate and di-2-ethoxyethyl peroxydicarbonate;
- peroxyesters such as t-butyl peroxyisobutyrate and t-butyl peroxypivalate;
- dialkyl peroxides such as di-t-butyl peroxide; and
- di[fluoro(or fluorochloro)acyl] peroxides.

The di[fluoro(or fluorochloro)acyl] peroxides include diacyl peroxides represented by [(RfCOO)—]$_2$ wherein Rf is a perfluoroalkyl group, an ω-hydroperfluoroalkyl group or a fluorochloroalkyl group.

Examples of the di[fluoro(or fluorochloro)acyl] peroxides include di(ω-hydro-dodecafluorohexanoyl) peroxide, di(ω-hydro-tetradecafluoroheptanoyl) peroxide, di(ω-hydrohexadecafluorononanoyl) peroxide, di(perfluoropropionyl) peroxide, di(perfluorobutyryl) peroxide, di(perfluorovaleryl) peroxide, di(perfluorohexanoyl) peroxide, di(perfluoroheptanoyl) peroxide, di(perfluorooctanoyl) peroxide, di(perfluorononanoyl) peroxide, di(ω-chloro-hexafluorobutyryl) peroxide, di(ω-chloro-decafluorohexanoyl) peroxide, di(ω-chloro-tetradecafluorooctanoyl) peroxide, ω-hydrodo-dodecafluoroheptanoyl-ω-hydrohexadecafluorononanoyl peroxide, ω-chloro-hexafluorobutyryl-ω-chloro-decafluorohexanoyl peroxide, ω-hydrododecafluoroheptanoyl-perfluorobutyryl peroxide, di(dichloropentafluorobutanoyl) peroxide, di(trichlorooctafluorohexanoyl) peroxide, di(tetrachloroundecafluorooctanoyl) peroxide, di(pentachlorotetradecafluorodecanoyl) peroxide and di(undecachlorotriacontafluorodocosanoyl) peroxide.

The water-soluble radical polymerization initiator may be a known water-soluble peroxide, and examples thereof include ammonium salts, potassium salts and sodium salts of persulfuric acid, perboric acid, perchloric acid, perphosphoric acid, percarbonic acid and the like, organic peroxides such as disuccinoyl peroxide and diglutaroyl peroxide, and t-butyl permaleate and t-butyl hydroperoxide. A reductant such as a sulfite salt may be combined with a peroxide and used, and the amount thereof to be used may be 0.1 to 20 times with respect to the peroxide.

In the polymerization, a surfactant, a chain transfer agent and a solvent may be used, which are conventionally known.

The surfactant may be a known surfactant, for example, nonionic surfactants, anionic surfactants and cationic surfactants may be used. Among these, fluorine-containing anionic surfactants are preferred, and more preferred are linear or branched fluorine-containing anionic surfactants having 4 to 20 carbon atoms, which may contain an ether bond oxygen (that is, an oxygen atom may be inserted between carbon atoms). The amount of the surfactant to be added (with respect to water in the polymerization) is preferably 50 to 5,000 ppm.

Examples of the chain transfer agent include hydrocarbons such as ethane, isopentane, n-hexane and cyclohexane; aromatics such as toluene and xylene; ketones such as acetone; acetate esters such as ethyl acetate and butyl acetate; alcohols such as methanol and ethanol; mercaptans such as methylmercaptan; and halogenated hydrocarbons such as carbon tetrachloride, chloroform, methylene chloride and methyl chloride. The amount of the chain transfer agent to be added may vary depending on the chain transfer constant value of the compound to be used, but is usually in the range of 0.01 to 20% by mass with respect to the solvent in the polymerization.

The solvent may include water and mixed solvents of water and an alcohol.

In the suspension polymerization, in addition to water, a fluorosolvent may be used. The fluorosolvent may include hydrochlorofluoroalkanes such as $CH_3CClF_2$, $CH_3CCl_2F$, $CF_3CF_2CCl_2H$ and $CF_2ClCF_2CFHCl$; chlorofluoroalkanes such as $CF_2ClCFClCF_2CF_3$ and $CF_3CFClCFClCF_3$; hydrofluoroalkanes such as $CF_3CFHCFHCF_2CF_2CF_3$, $CF_2HCF_2CF_2CF_2CF_2H$ and $CF_3CF_2CF_2CF_2CF_2CF_2CF_2H$; hydrofluoroethers such as $CH_3OC_2F_5$, $CH_3OC_3F_5CF_3CF_2CH_2OCHF_2$, $CF_3CHFCF_2OCH_3$, $CHF_2CF_2OCH_2F$, $(CF_3)_2CHCF_2OCH_3$, $CF_3CF_2CH_2OCH_2CHF_2$ and $CF_3CHFCF_2OCH_2CF_3$; and perfluoroalkanes such as perfluorocyclobutane, $CF_3CF_2CF_2CF_3$, $CF_3CF_2CF_2CF_2CF_3$ and $CF_3CF_2CF_2CF_2CF_2CF_3$, and among these, perfluoroalkanes are preferred. The amount of the fluorosolvent to be used is, from the viewpoint of the suspensibility and the economic efficiency, preferably 10 to 100% by mass with respect to an aqueous medium.

The polymerization temperature is not limited, and may be 0 to 100° C. The polymerization pressure is suitably set depending on other polymerization conditions such as the kind, the amount and the vapor pressure of the solvent to be used, and the polymerization temperature, but may usually be 0 to 9.8 MPaG.

In the case of obtaining an aqueous dispersion containing the copolymer by the polymerization reaction, the copolymer can be recovered by coagulating, cleaning and drying the copolymer contained in the aqueous dispersion. Then in the case of obtaining the copolymer as a slurry by the polymerization reaction, the copolymer can be recovered by taking out the slurry from a reaction container, and cleaning and drying the slurry. The copolymer can be recovered in a shape of powder by the drying.

The copolymer obtained by the polymerization may be formed into pellets. A method of forming into pellets is not limited, and a conventionally known method can be used. Examples thereof include methods of melt extruding the copolymer by using a single-screw extruder, a twin-screw extruder or a tandem extruder and cutting the resultant into a predetermined length to form the copolymer into pellets. The extrusion temperature in the melt extrusion needs to be varied depending on the melt viscosity and the production method of the copolymer, and is preferably the melting point of the copolymer+20° C. to the melting point of the copolymer+140° C. A method of cutting the copolymer is not limited, and there can be adopted a conventionally known method such as a strand cut method, a hot cut method, an underwater cut method, or a sheet cut method. Volatile components in the obtained pellets may be removed by heating the pellets (degassing treatment). Alternatively, the obtained pellets may be treated by bringing the pellets into contact with hot water of 30 to 200° C., steam of 100 to 200° C. or hot air of 40 to 200° C.

Alternatively, the copolymer obtained by the polymerization may be subjected to fluorination treatment. The fluorination treatment can be carried out by bringing the copolymer having been subjected to no fluorination treatment into contact with a fluorine-containing compound. By the fluorination treatment, thermally unstable functional groups of the copolymer, such as —COOH, —$COOCH_3$, —$CH_2OH$, —COF, —CF═$CF_2$ and —$CONH_2$, and thermally relatively stable functional groups thereof, such as —$CF_2H$, can be converted to thermally very stable —$CF_3$. Consequently, the total number (number of functional groups) of —COOH, —$COOCH_3$, —$CH_2OH$, —COF, —CF═$CF_2$, —$CONH_2$ and —$CF_2H$ of the copolymer can easily be controlled in the above-mentioned range.

The fluorine-containing compound is not limited, and includes fluorine radical sources generating fluorine radicals under the fluorination treatment condition. The fluorine radical sources include $F_2$ gas, $CoF_3$, $AgF_2$, $UF_6$, $OF_2$, $N_2F_2$, $CF_3OF$, halogen fluorides (for example, $IF_5$ and $ClF_3$).

The fluorine radical source such as $F_2$ gas may be, for example, one having a concentration of 100%, but from the viewpoint of safety, the fluorine radical source is preferably mixed with an inert gas and diluted therewith to 5 to 50% by mass, and then used; and it is more preferably to be diluted to 15 to 30% by mass and then used. The inert gas includes nitrogen gas, helium gas and argon gas, but from the viewpoint of the economic efficiency, nitrogen gas is preferred.

The condition of the fluorination treatment is not limited, and the copolymer in a melted state may be brought into contact with the fluorine-containing compound, but the fluorination treatment can be carried out usually at a temperature of not higher than the melting point of the copolymer, preferably at 20 to 240° C. and more preferably at 100 to 220° C. The fluorination treatment is carried out usually for 1 to 30 hours and preferably 5 to 25 hours. The fluorination treatment is preferred which brings the copolymer having been subjected to no fluorination treatment into contact with fluorine gas ($F_2$ gas).

The coating layer may contain other components as necessary. The other components include fillers, plasticizers, processing aids, mold release agents, pigments, flame retarders, lubricants, light stabilizers, weathering stabilizers, electrically conductive agents, antistatic agents, ultraviolet absorbents, antioxidants, foaming agents, perfumes, oils, softening agents and dehydrofluorination agents.

Examples of the fillers include silica, kaolin, clay, organo clay, talc, mica, alumina, calcium carbonate, calcium terephthalate, titanium oxide, calcium phosphate, calcium fluoride, lithium fluoride, crosslinked polystyrene, potassium titanate, carbon, boron nitride, carbon nanotube and glass fiber. The electrically conductive agents include carbon black. The plasticizers include dioctyl phthalate and pentaerythritol. The processing aids include carnauba wax, sulfone compounds, low molecular weight polyethylene and fluorine-based auxiliary agents. The dehydrofluorination agents include organic oniums and amidines.

As the above-mentioned other components, other polymers other than the copolymer may be used. The other polymers include fluororesins other than the copolymer, fluoroelastomer, and non-fluorinated polymers.

The coated electric wire of the present disclosure has a core wire, and a coating layer installed on the periphery of the core wire and containing the above copolymer. For example, an extrusion formed article made by melt extrusion forming the above copolymer on a core wire can be made into the coating layer. The coated electric wire is suitable for LAN cables (Ethernet Cables), high-frequency transmission cables, flat cables, heat resistant cables, and the like, and among them, it is suitable for transmission cables such as LAN cables (Ethernet Cables) and high-frequency transmission cables.

As a material for the core wire, for example, a metal conductor material such as copper or aluminum can be used. The core wire is preferably one having a diameter of 0.02 to 3 mm. The diameter of the core wire is more preferably 0.04 mm or larger, still more preferably 0.05 mm or larger and especially preferably 0.1 mm or larger. The diameter of the core wire is more preferable 2 mm or smaller.

With regard to specific examples of the core wire, there may be used, for example, AWG (American Wire Gauge)-46 (solid copper wire of 40 μm in diameter), AWG-26 (solid copper wire of 404 μm in diameter), AWG-24 (solid copper wire of 510 μm in diameter), and AWG-22 (solid copper wire of 635 μm in diameter).

The coating layer is preferably one having a thickness of 0.1 to 3.0 mm. It is also preferable that the thickness of the coating layer is 2.0 mm or smaller.

The high-frequency transmission cables include coaxial cables. The coaxial cables generally have a structure configured by laminating an inner conductor, an insulating coating layer, an outer conductor layer and a protective coating layer in order from the core part to the peripheral part. The thickness of each layer in the above structure is not limited, and is usually: the diameter of the inner conductor is approximately 0.1 to 3 mm; the thickness of the insulating coating layer is approximately 0.3 to 3 mm; the thickness of the outer conductor layer is approximately 0.5 to 10 mm; and the thickness of the protective coating layer is approximately 0.5 to 2 mm.

Alternatively, the coating layer may be one containing cells, and is preferably one in which cells are homogeneously distributed.

The average cell size of the cells is not limited, and is, for example, preferably 60 μm or smaller, more preferably 45 μm or smaller, still more preferably 35 μm or smaller, further still more preferably 30 μm or smaller, especially preferable 25 μm or smaller and further especially preferably 23 μm or smaller. Then, the average cell size is preferably 0.1 μm or larger and more preferably 1 μm or larger. The average cell size can be determined by taking an electron microscopic image of an electric wire cross section, calculating the diameter of each cell through image processing and averaging the diameters by image processing.

The foaming ratio of the coating layer may be 20% or higher, and is more preferably 30% or higher, still more preferably 33% or higher and further still more preferably 35% or higher. The upper limit is not limited, and is, for example, 80%. The upper limit of the foaming ratio may be 60%. The foaming ratio is a value determined as ((the specific gravity of an electric wire coating material−the specific gravity of the coating layer)/the specific gravity of the electric wire coating material)×100. The foaming ratio can suitably be regulated according to applications, for example, by regulation of the amount of a gas, described later, to be injected in an extruder, or by selection of the kind of a gas dissolving.

Alternatively, the coated electric wire may have another layer between the core wire and the coating layer, and may further have another layer (outer layer) on the periphery of the coating layer. In the case where the coating layer contains cells, the electric wire of the present disclosure may be of a two-layer structure (skin-foam) in which a non-foaming layer is inserted between the core wire and the coating layer, a two-layer structure (foam-skin) in which a non-foaming layer is coated as the outer layer, or a three-layer structure (skin-foam-skin) in which a non-foaming layer is coated as the outer layer of the skin-foam structure. The non-foaming layer is not limited, and may be a resin layer composed of a resin, such as a TFE/HFP-based copolymer, a TFE/PAVE copolymer, a TFE/ethylene-based copolymer, a vinylidene fluoride-based polymer, a polyolefin resin such as polyethylene [PE], or polyvinyl chloride [PVC].

The coated electric wire can be produced, for example, by using an extruder, heating the copolymer, extruding the copolymer in a melt state on the core wire to thereby form the coating layer.

In formation of a coating layer, by heating the copolymer and introducing a gas in the copolymer in a melt state, the coating layer containing cells can be formed. As the gas, there can be used, for example, a gas such as chlorodifluoromethane, nitrogen or carbon dioxide, or a mixture thereof. The gas may be introduced as a pressurized gas in the heated copolymer, or may be generated by mingling a chemical foaming agent in the copolymer. The gas dissolves in the copolymer in a melt state.

Although the embodiments have been described above, it will be understood that various changes in form and details are possible without departing from the gist and scope of the claims.

According to the present disclosure, there is provided a coated electric wire having a core wire and a coating layer installed on the periphery of the core wire, wherein the coating layer contains a copolymer containing tetrafluoroethylene unit and perfluoro(propyl vinyl ether) unit, the content of perfluoro(propyl vinyl ether) unit in the copolymer is 4.8 to 5.5% by mass with respect to the whole of the monomer units, the melt flow rate at 372° C. of the copolymer is 28.0 to 37.0 g/10 min, and the number of functional groups of the copolymer is 50 or less per $10^6$ main-chain carbon atoms.

In the coated electric wire of the present disclosure, the content of perfluoro(propyl vinyl ether) unit in the copolymer is preferably 5.0 to 5.4% by mass with respect to the whole of the monomer units.

In the coated electric wire of the present disclosure, the melt flow rate at 372° C. of the copolymer is preferably 30.0 to 35.0 g/10 min.

EXAMPLES

Next, embodiments of the present disclosure will be described with reference to examples, but the present disclosure is not intended to be limited by these examples.

The numerical values of the Examples were measured by the following methods.

(Content of a Monomer Unit)

The content of each monomer unit was measured by an NMR analyzer (for example, manufactured by Bruker BioSpin GmbH, AVANCE 300, high-temperature probe).

(Melt Flow Rate (MFR))

The polymer was made to flow out from a nozzle of 2.1 mm in inner diameter and 8 mm in length at 372° C. under a load of 5 kg by using a Melt Indexer G-01 (manufactured by Toyo Seiki Seisaku-sho, Ltd.) according to ASTM D1238, and the mass (g/10 min) of the polymer flowing out per 10 min was determined.

(Number of Functional Groups)

Pellets of the copolymer was molded by cold press into a film of 0.25 to 0.30 mm in thickness. The film was 40 times scanned and analyzed by a Fourier transform infrared spectrometer [FT-IR (Spectrum One, manufactured by PerkinElmer, Inc.)] to obtain an infrared absorption spectrum, and a difference spectrum against a base spectrum that is completely fluorinated and has no functional groups is obtained. From an absorption peak of a specific functional group observed on this difference spectrum, the number N of the functional group per $1\times10^6$ carbon atoms in the sample was calculated according to the following formula (A).

$$N=I\times K/t \qquad (A)$$

I: absorbance

K: correction factor t: thickness of film (mm)

Regarding the functional groups in the present disclosure, for reference, the absorption frequency, the molar absorption coefficient and the correction factor are shown in Table 2. The molar absorption coefficients are those determined from FT-IR measurement data of low molecular model compounds.

[Table 2]

TABLE 2

| Functional Group | Absorption Frequency ($cm^{-1}$) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |

TABLE 2-continued

| Functional Group | Absorption Frequency ($cm^{-1}$) | Molar Extinction Coefficient (l/cm/mol) | Correction Factor | Model Compound |
|---|---|---|---|---|
| —$COOCH_3$ | 1795 | 680 | 342 | $C_7F_{15}COOCH_3$ |
| —$CONH_2$ | 3436 | 506 | 460 | $C_7H_{15}CONH_2$ |
| —$CH_2OH_2$, —OH | 3648 | 104 | 2236 | $C_7H_{15}CH_2OH$ |
| —$CF_2H$ | 3020 | 8.8 | 26485 | $H(CF_2CF_2)_3CH_2OH$ |
| —$CF{=}CF_2$ | 1795 | 635 | 366 | $CF_2{=}CF_2$ |

(Melting Point)

The polymer was heated, as a first temperature raising step at a temperature-increasing rate of 10° C./min from 200° C. to 350° C., then cooled at a cooling rate of 10° C./min from 350° C. to 200° C., and then again heated, as second temperature raising step, at a temperature-increasing rate of 10° C./min from 200° C. to 350° C. by using a differential scanning calorimeter (trade name: X-DSC7000, manufactured by Hitachi High-Tech Science Corp.); and the melting point was determined from a melting curve peak observed in the second temperature raising step.

Comparative Example 1

51.8 L of pure water was charged in a 174 L-volume autoclave; nitrogen replacement was sufficiently carried out; thereafter, 40.9 kg of perfluorocyclobutane, 2.17 kg of perfluoro(propyl vinyl ether) (PPVE) and 1.97 kg of methanol were charged; and the temperature in the system was held at 35° C. and the stirring speed was held at 200 rpm. Then, tetrafluoroethylene (TFE) was introduced under pressure up to 0.64 MPa, and thereafter 0.103 kg of a 50% methanol solution of di-n-propyl peroxydicarbonate was charged to initiate polymerization. Since the pressure in the system decreased along with the progress of the polymerization, TFE was continuously supplied to make the pressure constant, and 0.048 kg of PPVE was additionally charged for every 1 kg of TFE supplied. The polymerization was finished at the time when the amount of TFE additionally charged reached 40.9 kg. Unreacted TFE was released to return the pressure in the autoclave to the atmospheric pressure, and thereafter, an obtained reaction product was washed with water and dried to thereby obtain 42.9 kg of a powder.

The obtained powder was melt extruded at 360° C. by a screw extruder (trade name: PCM46, manufactured by Ikegai Corp.) to thereby obtain pellets of a TFE/PPVE copolymer. By using the obtained pellets, the PPVE content was measured by the above-mentioned method.

The obtained pellets were put in a vacuum vibration-type reactor VVD-30 (manufactured by Okawara MFG. Co., Ltd.), and heated to 210° C. After vacuumizing, $F_2$ gas diluted to 20% by volume with $N_2$ gas was introduced to the atmospheric pressure. 0.5 hour after the $F_2$ gas introduction, vacuumizing was once carried out and the $F_2$ gas was again introduced. Further, 0.5 hour thereafter, vacuumizing was again carried out and $F_2$ gas was again introduced. Thereafter, while the above operation of the $F_2$ gas introduction and the vacuumizing was carried out once every 1 hour, the reaction was carried out at a temperature of 210° C. for 10 hours. After the reaction was finished, the reactor interior was replaced sufficiently by $N_2$ gas to finish the fluorination reaction. By using the fluorinated pellets, the above physical properties were measured by the methods described above.

Comparative Example 2

Fluorinated pellets were obtained as in Comparative Example 1, except for changing the charged amount of PPVE to 2.94 kg, changing the charged amount of methanol to 4.57 kg, changing the charged amount of the 50% methanol solution of di-n-propyl peroxydicarbonate to 0.051 kg, and adding 0.062 kg of PPVE for every 1 kg of TFE supplied, to thereby obtain 43.4 kg of dry powder.

Comparative Example 3

Fluorinated pellets were obtained as in Comparative Example 1, except for changing the charged amount of PPVE to 2.75 kg, adding no methanol, and adding 0.058 kg of PPVE for every 1 kg of TFE supplied, to thereby obtain 43.3 kg of dry powder.

Comparative Example 4

Fluorinated pellets were obtained as in Comparative Example 1, except for changing the charged amount of PPVE to 2.56 kg, changing the charged amount of methanol to 2.29 kg, and adding 0.055 kg of PPVE for every 1 kg of TFE supplied, to thereby obtain 43.1 kg of dry powder.

Comparative Example 5

Non-fluorinated pellets were obtained as in Comparative Example 1, except for changing the charged amount of PPVE to 2.62 kg, changing the charged amount of methanol to 1.75 kg, and adding 0.056 kg of PPVE for every 1 kg of TFE supplied, to thereby obtain 43.2 kg of dry powder.

Example 1

Fluorinated pellets were obtained as in Comparative Example 1, except for changing the charged amount of PPVE to 2.43 kg, changing the charged amount of methanol to 1.33 kg, adding 0.053 kg of PPVE for every 1 kg of TFE supplied, changing the raised temperature of the vacuum vibration-type reactor to 180° C., and changing the reaction condition to at 180° C. and for 10 hours, to thereby obtain 43.1 kg of dry powder.

Example 2

Fluorinated pellets were obtained as in Comparative Example 1, except for changing the charged amount of PPVE to 2.56 kg, changing the charged amount of methanol to 1.42 kg, and adding 0.055 kg of PPVE for every 1 kg of TFE supplied, to thereby obtain 43.1 kg of dry powder.

Example 3

Fluorinated pellets were obtained as in Comparative Example 1, except for changing the charged amount of PPVE to 2.69 kg, changing the charged amount of methanol to 1.28 kg, and adding 0.057 kg of PPVE for every 1 kg of TFE supplied, to thereby obtain 43.2 kg of dry powder.

By using the pellets obtained in Examples and Comparative Examples, the above physical properties were measured by the methods described above. The results are shown in Table 3.

[Table 3]

TABLE 3

| | PPVE content (% by mass) | MFR (g/10 min) | Number of functional groups (number/C$10^6$) | Melting point (° C.) |
|---|---|---|---|---|
| Comparative Example 1 | 4.6 | 30.0 | <6 | 304 |
| Comparative Example 2 | 5.8 | 30.9 | <6 | 302 |
| Comparative Example 3 | 5.5 | 26.0 | <6 | 302 |
| Comparative Example 4 | 5.2 | 42.0 | <6 | 302 |
| Comparative Example 5 | 5.3 | 34.0 | 312 | 302 |
| Example 1 | 5.0 | 30.0 | 15 | 302 |
| Example 2 | 5.2 | 33.0 | <6 | 302 |
| Example 3 | 5.4 | 35.0 | <6 | 302 |

The description of "<6" in Table 3 means that the number of functional groups is less than 6.

Then, by using the obtained pellets, the following properties were evaluated. The results are shown in Table 4.

(Electric Wire Formation)

Extrusion coating of the copolymer in the following coating thickness was carried out on a conductor of 0.50 mm in conductor diameter by a 30-mmφ electric wire coating forming machine (manufactured by Tanabe Plastics Machinery Co., Ltd.), to thereby obtain a coated electric wire. The extrusion conditions for the electric wire coating were as follows.

a) Core conductor: mild steel wire conductor of 0.50 mm in conductor diameter
b) Coating thickness: 0.20 mm
c) Coated electric wire diameter: 0.90 mm
d) Electric wire take-over speed: 150 m/min
e) Extrusion condition:
   Cylinder screw diameter=30 mm, a single screw extruder of L/D=22
   Die (inner diameter)/tip (outer diameter)=8.0 mm/5.0 mm Set temperature of the extruder: barrel section C-1 (330° C.), barrel section C-2 (360° C.), barrel section C-3 (375° C.), head section H (390° C.), die section D-1 (405° C.), die section D-2 (395° C.). Set temperature for preheating core wire: 80° C.

(Core Wire Corrosion Test)

The obtained coated electric wire was cut out into a length of 20 cm, installed in a water bath filled with a commercially available carbonated beverage (MITSUYA CIDER®, manufactured by Asahi Soft Drinks Co., Ltd.), and allowed to stand still at 65° C. for 2 weeks, and thereafter, the coating layer was peeled off to bare the conductor; and the surface of the conductor was visually observed and the evaluation was made according to the following criteria.

Good: no corrosion observed.

Poor: corrosion observed.

(Tensile Creep Test)

The tensile creep strain was measured by using TMA-7100 manufactured by Hitachi High-Tech Science Corporation. The coating layer of the obtained coated electric wire was peeled off to prepare a sample of 2 mm in width and 22 mm in length from the obtained coating layer. The sample was mounted on the measurement jig with a 10 mm distance between jigs. A load was applied to the sample such that the load on the cross-section was 3.32 N/mm$^2$, the sample was allowed to stand at 200° C., and the displacement (mm) of the length of the sample from the time point 70 min after the start of the test until the time point 1,320 min after the start of the test was measured to thereby calculate the proportion (tensile creep strain (%)) of the displacement of the length (mm) to the length of the initial sample length (10 mm). A sheet having a small tensile creep strain (%) measured under the condition of 200° C. and 1,320 min hardly elongates even when a tensile load is applied in a high temperature environment for a long time and is excellent in the long-time tensile creep property.

(Crack Resistance)

10 pieces of electric wire of 20 cm in length were cut out from the obtained coated electric wire, and used as electric wires for the crack test (test pieces). The test pieces were subjected to a heat treatment at 230° C. for 24 hours in a straight state thereof. The test pieces were taken out and each wound on an electric wire having the same diameter as the test pieces to make specimens; and the specimens were again subjected to a heat treatment at 250° C. for 1 hour, and taken out and cooled at room temperature; thereafter, the electric wires were unwound and the number of the electric wires having a crack(s) generated was counted visually and by using a magnifying glass. The case where one piece of the electric wire had a crack(s) even at one spot was determined as having a crack. The case where the number of the electric wires confirmed to have a crack was 0 in the 10 pieces thereof was ranked as Good; the case of 1, as Fair; and the case of 2 or more, as Poor.

(Electric Wire Abrasion Test)

An electric wire of 20 cm was cut out from the obtained coated electric wire, and subjected to a reciprocating abrasion test by using a No. 215 Scrape Tester (reciprocation type) manufactured by Yasuda Seiki Seisakusho, Ltd. at a load of 200 g and at room temperature using a copper wire of 0.9 mm in diameter as the material of the needle, and the number of reciprocation until the coating was scraped and the wire was electrified was counted.

(Electric Wire Coating Property)

By using the pellets obtained in Examples and Comparative Examples and boron nitride (BN) having an average particle size of 13.5 μm, a composition in which the BN content was 0.75% by weight based on the total amount of the pellets and BN was prepared in the same manner as described in Examples of International Publication No. WO 03/000972.

By using the obtained composition and an extruder for foam forming, a foam-coated electric wire was prepared. The extruder for foam forming was configured from an extruder and a system manufactured by Hijiri Manufacturing Ltd., a gas injection nozzle manufactured by Micodia, and a crosshead manufactured by UNITEC Co., Ltd. The screw was provided with a mixing zone to uniformly disperse the introduced nitrogen.

The capacitance was measured by online by using CAPAC300 19C (manufactured by ZUMBACH Electronic AG). The foaming ratio was controlled by the online capacitance.

The extrusion conditions for the electric wire coating were as follows.

a) Core conductor: mild steel wire conductor of 0.60 mm in conductor diameter
b) Coating thickness: 0.25 mm
c) Coated electric wire diameter: 1.1 mm
d) Electric wire take-over speed: 80 m/min
e) Extrusion condition:
Cylinder screw diameter=35 mm, a single-screw extruder of L/D=32
Die (inner diameter)/tip (outer diameter)=4.7 mm/2.2 mm Set temperature of the extruder: barrel section C-1 (330° C.), barrel section C-2 (360° C.), barrel section C-3 (370° C.), head section H-1 (375° C.), head section H-2 (365° C.), head section H-3 (360° C.). Set temperature for preheating core wire: 90° C.
f) Nitrogen pressure: 30 MPa
g) Nitrogen flow rate: 15 cc/min
h) Capacitance: 150±3 pF/m The spark of the coated electric wire obtained by using a Beta LaserMike Sparktester HFS1220 at a voltage of 1,500 V was measured by online.

The case where the number of sparks per 4,500 m was 1 was ranked as Good; the case of 0, as Excellent; and the case of 2 or more, as Rejected.

(Dielectric Loss Tangent)

By melt forming the pellets, a cylindrical test piece of 2 mm in diameter was prepared. The prepared test piece was set in a cavity resonator for 6 GHz, manufactured by KANTO Electronic Application and Development Inc., and the dielectric loss tangent was measured by a network analyzer, manufactured by Agilent Technologies Inc. By analyzing the measurement result by analysis software "CPMA", manufactured by KANTO Electronic Application and Development Inc., on PC connected to the network analyzer, the dielectric loss tangent (tan δ) at 20° C. at 6 GHz was determined.

[Table 4]

TABLE 4

| | Core wire corrosion test | Electric wire coating tensile creep at 200° C. (%) | Crack resistance | Electric wire abrasion test (times) | Electric wire coating property Evaluation of spark | Dielectric loss tangent |
|---|---|---|---|---|---|---|
| Comparative Example 1 | Good | 2.88 | Fair | 89 | Good | 0.00036 |
| Comparative Example 2 | Good | 4.18 | Good | 130 | Good | 0.00038 |
| Comparative Example 3 | Good | 3.81 | Good | 139 | Rejected | 0.00038 |
| Comparative Example 4 | Good | 3.47 | Poor | 81 | Good | 0.00035 |
| Comparative Example 5 | Poor | 3.91 | Fair | 102 | Excellent | 0.00109 |
| Example 1 | Good | 3.26 | Good | 106 | Good | 0.00040 |
| Example 2 | Good | 3.41 | Good | 102 | Excellent | 0.00036 |
| Example 3 | Good | 3.55 | Good | 100 | Excellent | 0.00036 |

The invention claimed is:

1. A coated electric wire, comprising a core wire and a coating layer installed on a periphery of the core wire,
wherein the coating layer comprises a copolymer comprising tetrafluoroethylene unit and perfluoro(propyl vinyl ether) unit;
the content of perfluoro(propyl vinyl ether) unit in the copolymer is 4.8 to 5.5% by mass with respect to the whole of the monomer units;
a melt flow rate at 372° C. of the copolymer is 28.0 to 37.0 g/10 min; and the total number of —CF═CF$_2$, —CF$_2$H, —COF, —COOH, —COOCH$_3$, —CONH$_2$ and —CH$_2$OH of the copolymer is 50 or less per $10^6$ main-chain carbon atoms.

2. The coated electric wire according to claim 1, wherein the content of perfluoro(propyl vinyl ether) unit in the copolymer is 5.0 to 5.4% by mass with respect to the whole of the monomer units.

3. The coated electric wire according to claim 2, wherein the melt flow rate at 372° C. of the copolymer is 30.0 to 35.0 g/10 min.

4. The coated electric wire according to claim 3, wherein the content of tetrafluoroethylene unit in the copolymer is 94.6 to 95.0% by mass with respect to the whole of the monomer units.

5. The coated electric wire according to claim 2, wherein the content of tetrafluoroethylene unit in the copolymer is 94.6 to 95.0% by mass with respect to the whole of the monomer units.

6. The coated electric wire according to claim 2, wherein the melt flow rate at 372° C. of the copolymer is 28.0 to 35.0 g/10 min.

7. The coated electric wire according to claim 6, wherein the content of tetrafluoroethylene unit in the copolymer is 94.6 to 95.0% by mass with respect to the whole of the monomer units.

8. The coated electric wire according to claim 1, wherein the melt flow rate at 372° C. of the copolymer is 30.0 to 35.0 g/10 min.

9. The coated electric wire according to claim 8, wherein the content of tetrafluoroethylene unit in the copolymer is 94.5 to 95.2% by mass with respect to the whole of the monomer units.

10. The coated electric wire according to claim 1, wherein the content of tetrafluoroethylene unit in the copolymer is 94.5 to 95.2% by mass with respect to the whole of the monomer units.

11. The coated electric wire according to claim 1, wherein the content of perfluoro(propyl vinyl ether) unit in the copolymer is 4.8 to 5.4% by mass with respect to the whole of the monomer units.

12. The coated electric wire according to claim 11, wherein the melt flow rate at 372° C. of the copolymer is 30.0 to 35.0 g/10 min.

13. The coated electric wire according to claim 12, wherein the content of tetrafluoroethylene unit in the copolymer is 94.6 to 95.2% by mass with respect to the whole of the monomer units.

14. The coated electric wire according to claim 11, wherein the melt flow rate at 372° C. of the copolymer is 30.0 to 35.0 g/10 min.

15. The coated electric wire according to claim 14, wherein the content of tetrafluoroethylene unit in the copolymer is 94.6 to 95.2% by mass with respect to the whole of the monomer units.

16. The coated electric wire according to claim 11, wherein the content of tetrafluoroethylene unit in the copolymer is 94.6 to 95.2% by mass with respect to the whole of the monomer units.

17. The coated electric wire according to claim 1, wherein the melt flow rate at 372° C. of the copolymer is 28.0 to 35.0 g/10 min.

18. The coated electric wire according to claim 17, wherein the content of tetrafluoroethylene unit in the copolymer is 94.5 to 95.2% by mass with respect to the whole of the monomer units.

* * * * *